April 30, 1935.  F. N. TILTON  1,999,264
SCREW MACHINE
Original Filed Sept. 22, 1933  6 Sheets-Sheet 1

Fig. 1

INVENTOR
Fred N. Tilton
Harry P. Williams
Atty.

April 30, 1935.　　　F. N. TILTON　　　1,999,264

SCREW MACHINE

Original Filed Sept. 22, 1933　　6 Sheets-Sheet 3

April 30, 1935.   F. N. TILTON   1,999,264
SCREW MACHINE
Original Filed Sept. 22, 1933   6 Sheets-Sheet 4

April 30, 1935.  F. N. TILTON  1,999,264
SCREW MACHINE
Original Filed Sept. 22, 1933  6 Sheets—Sheet 5

INVENTOR
Fred N. Tilton
by Harry R. Williams
Atty

Patented Apr. 30, 1935

1,999,264

UNITED STATES PATENT OFFICE 1,999,264

SCREW MACHINE

Fred N. Tilton, Hartford, Conn.

Application September 22, 1933, Serial No. 690,533
Renewed October 25, 1934

53 Claims. (Cl. 10—4)

This invention relates to machines for threading screw blanks.

The object of the invention is to provide a machine for threading or for pointing and threading blanks, which is relatively simple and compact and which may be operated very rapidly for producing accurately threaded wood screws, or machine screws, or screw studs, or the like.

The machine illustrated has an intermittently revolved turret that has a plurality of peripheral sockets for receiving the blanks and which carries a plurality of annularly located rotatory and reciprocatory spindles having means for engaging and rotating the blanks, and which also carries mechanism for rotating the spindles and for revolving the turret. Means are provided for regulating the speed of the turret also for stopping and indexing the turret at its several stations. Movable toward the turret is a table having angularly located means for supporting a plurality of threading cutters or a plurality of both pointing cutters and threading cutters. These cutters are circular milling hobs, each having a large number of teeth, that are free to rotate on arbors held by the supporting means attached to the table. The pointing cutters, if employed, start the threads by movement axially of the blanks against their ends, and the threading cutters complete the threads by movement along the blanks parallel with their axes.

Figure 2:
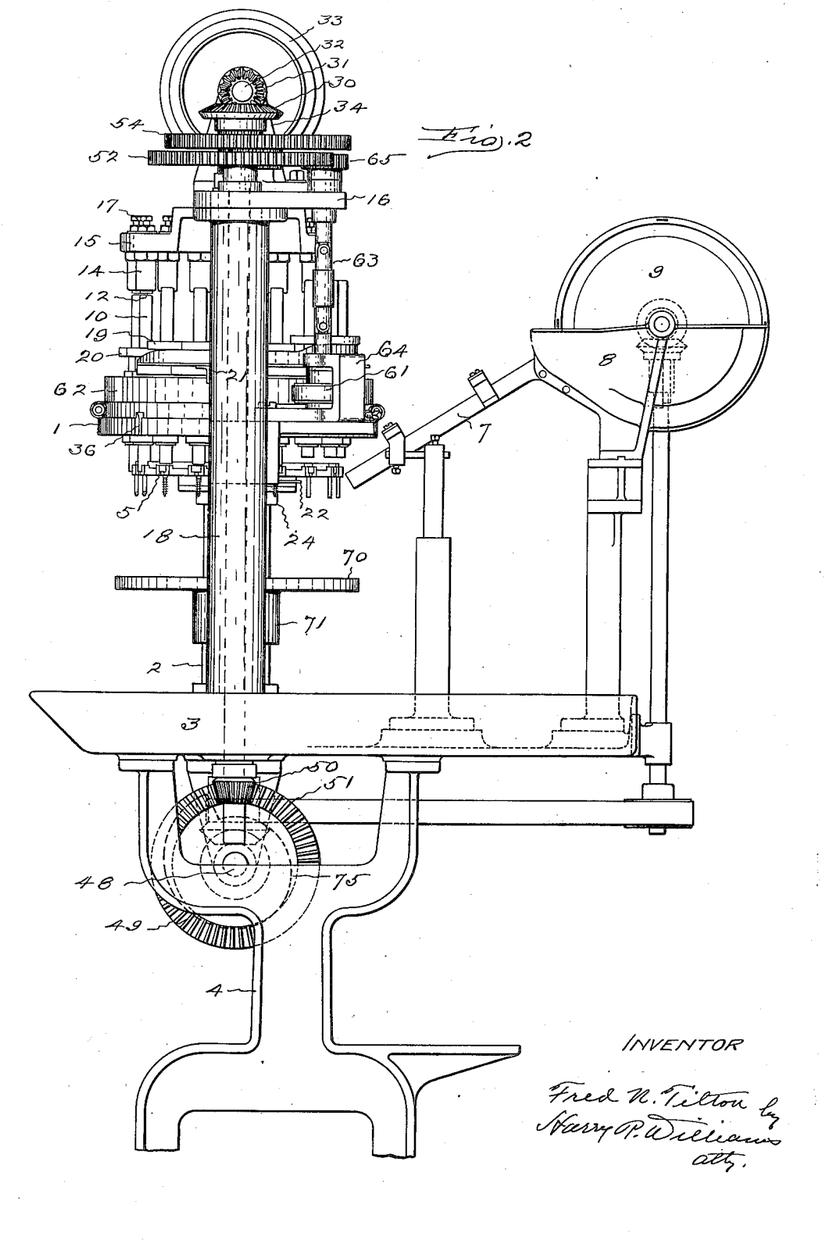
Fig. 2 shows a side elevation of the machine and a blank feeding mechanism.
Figure 3:
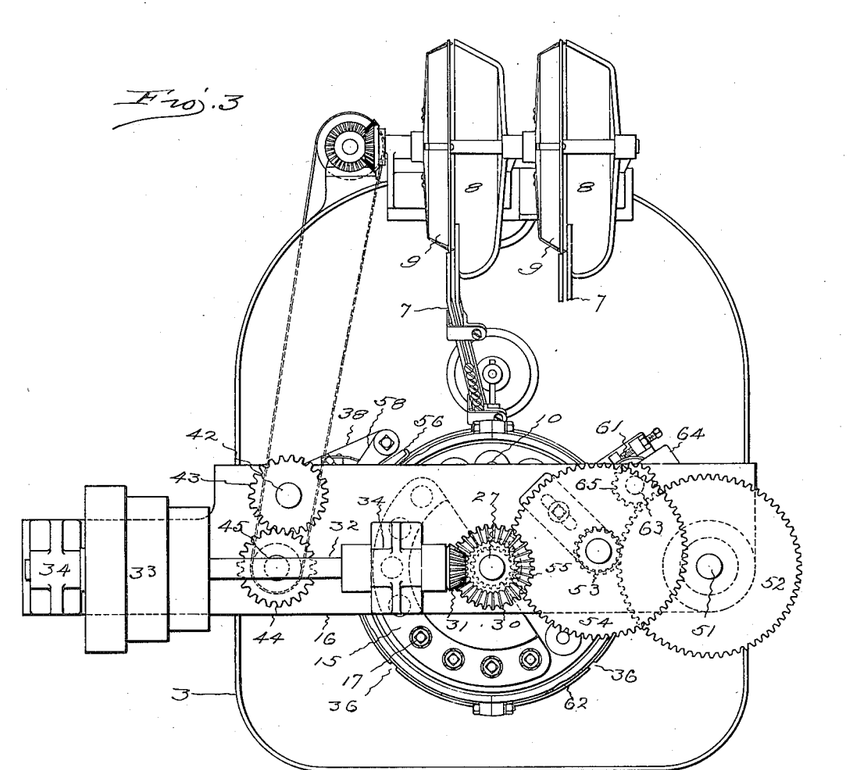
Fig. 3 shows a plan view of the machine and feed.

In the machine illustrated the circular turret 1 is mounted so that it may be rotated in a horizontal plane on a hollow post 2 the lower end of which is fastened to the top of the bed 3 that is supported by a suitable frame 4. Fastened to the under side of and extending outward from the periphery of the lower section of the turret are a plurality of plates 5 that have chucks or sockets 6 in their outer ends for receiving the blanks and retaining them by their heads. The plates 5 are detachably secured in place so that others with sockets of different size depending upon the size of blanks may be substituted. Sixteen plates are shown (Fig. 15), and the blanks, the heads of which may be angular, socketed or slotted, are delivered in succession to the sockets by any suitable feed mechanism. The feed mechanism, of which there may be one or more, two being indicated, has an inclined chute 7 and a hopper 8 with means 9 for lifting the blanks from the hopper to the chute (Figs. 2, 3). The lower end of the chute terminates adjacent to the blank carrying sockets of the turret.

The upper part of the turret is hollow and it carries a plurality of vertical angularly located spindles 10. The machine illustrated has sixteen spindles that are capable of vertical movement and also of being rotated. The axes of the spindles are in alignment with the axes of the blank carrying sockets, and at their lower ends they are provided with chucks, or sockets III and blades II that are designed to engage and center the blank head carried by the sockets, for, at the proper times, rotating the blanks.

Figure 1:
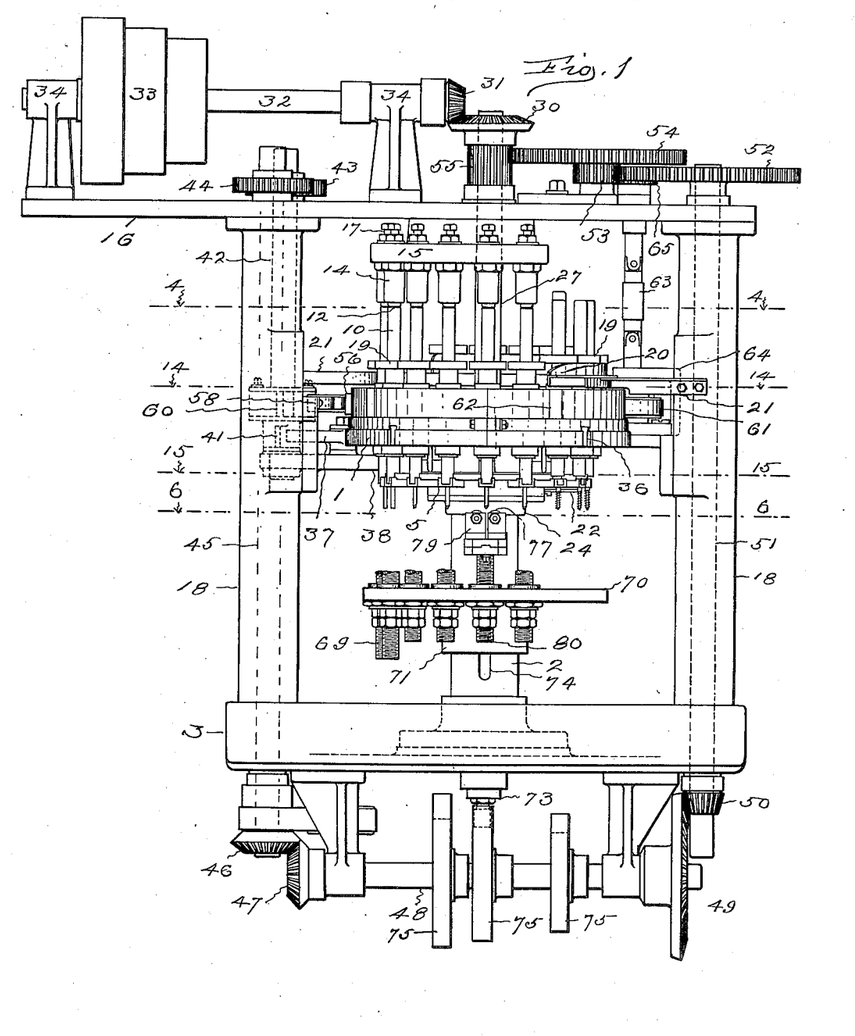
Fig. 1 of the accompanying drawings shows a front elevation of the machine with the pointing tools and the supporting frame omitted.
Figure 4:
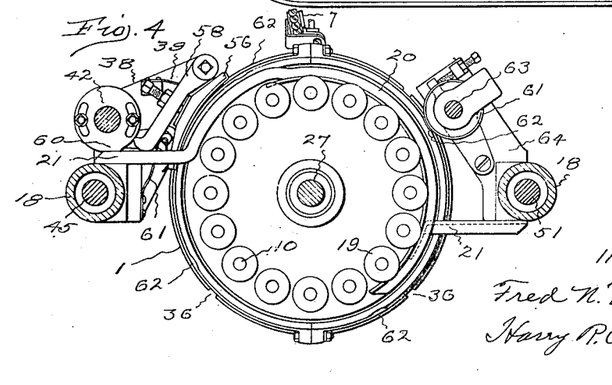
Fig. 4 is a horizontal section looking down at the turret from the plane indicated by the dotted line 4—4 on Fig. 1.

Gravity normally retains the spindles at the lower limit of their movements. Fastened to the spindles are collars 19 which at one sector during the revolution of the turret engage an arc-shaped cam 20 and are lifted thereby so as to raise the blank rotating means from the heads of the blanks (Figs. 1, 2). The cam 20 is fastened to brackets 21 which are secured to the posts 18 (Fig. 4).

Figures 5, 8, 8A, 9, 9A:
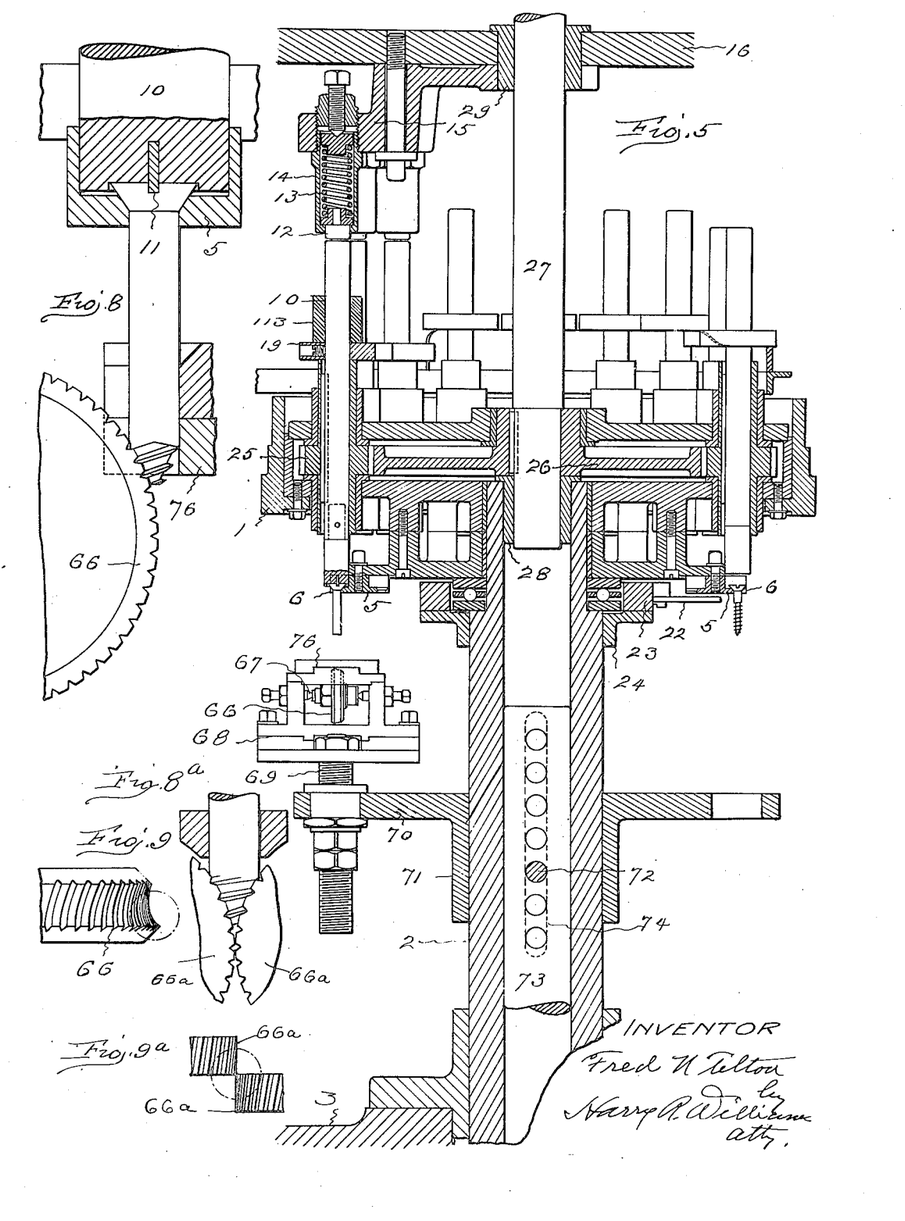
Fig. 5 is a central vertical section on larger scale, of the upper part of the machine.
Fig. 8 on exaggerated scale shows a pointing cutter in action on a blank.
Fig. 8a shows a modified form of pointing means.
Fig. 9 is an edge view of the pointing cutter shown in Fig. 8.
Fig. 9a is an edge view of the modified form of pointing means.

The upward movements of the spindles are resisted while the blanks are being pointed and threaded by weights 113 or springs 13, preferably by buttons 12 and springs 13 in sleeves 14 held by a bracket 15 that is fastened to the top plate 16 which is supported by hollow posts 18, the tension of the springs being regulated by screws 17 (Fig. 5). Weights if placed on the spindles rest on the collars 19. The spindles are lifted by the cam 20 before they reach the blank discharging sector and are held raised until beyond the blank receiving sector, and then allowed to drop, being yieldingly held from rising by the weights or spring pressed buttons while passing the pointing and threading sectors.

Figures 14, 15:
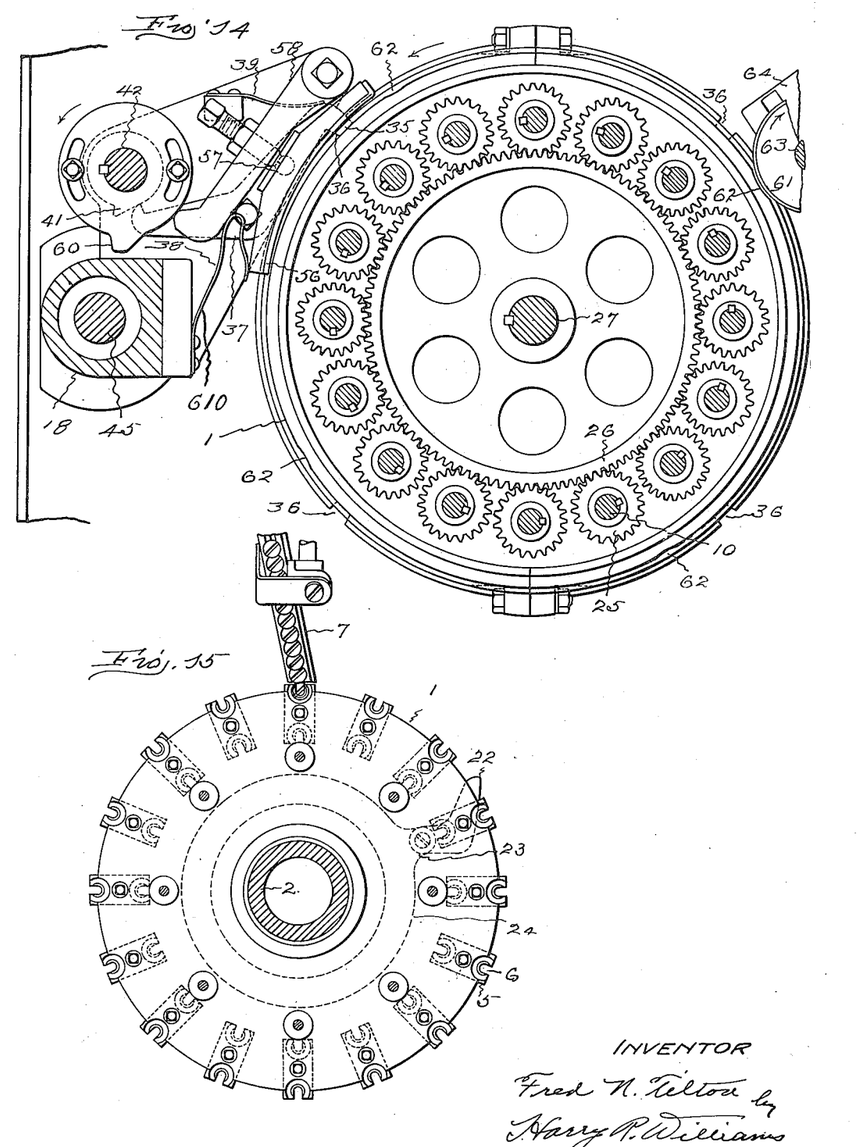
Fig. 14 is a horizontal section on the plane indicated by the dotted line 14—14 on Fig. 1, looking down into the turret and showing the turret revolving and spindle rotating gears.
Fig. 15 is a horizontal section on the plane indicated by the dotted line 15—15 on Fig. 1, looking down on to the blank receiving plate.

The finished blanks are pushed from the carrier sockets, as the turret rotates, by a finger 22 that is fastened to a ring 23 which is secured to a sleeve 24 on the post 2. (Figs. 5, 15).

In the turret and splined on each spindle is a pinion 25. Engaging the pinions is a central gear 26 which is keyed to a vertical shaft 27 (Figs. 5, 14). The lower end of the shaft 27 is fitted into a bushing 28 in the upper end of the post 2 and near the upper end the shaft is fitted through a bushing 29 in the top plate 16. Fastened to the upper end of the shaft 27 is a bevel gear 30 that is engaged by a bevel gear 31 on a horizontal shaft 32 which is provided with a driving pulley 33 and is supported by brackets 34 fastened to the top plate 16 (Figs. 1, 3). When the turret is locked the rotation of the central gear rotates the spindles very rapidly and when the turret is unlocked the engagement of the gear teeth with the pinion teeth causes the turret to revolve.

The turret is indexed correctly at its several stopping stations, four in the machine shown, by means of a detent 35 which at the proper time enters notches 36 in the periphery of the lower part of the upper section of the turret. The detent is at the end of a lever 37 which is pivoted on a bracket 38 that is fastened to one of the posts 18 (Figs. 1, 14). A spring 39 fastened to the bracket tends to press the detent toward the turret. The detent, at the proper time, is released from a notch by the engagement of a cam 41 on a vertical shaft 42 with the end of the lever 37 (Fig. 14). At the upper end of the shaft 42, above the top plate 16, is a gear 43 that engages a gear 44 on the upper end of a shaft 45 which extends vertically through one of the posts 18. The shaft 45 below the bed 3 has a bevel gear 46 that engages a bevel gear 47 on an end of a horizontal shaft 48. On the other end of the shaft 48 is a gear 49 which engages with a pinion 50 on the lower end of a shaft 51. The shaft 51 extends vertically through a post 18 and at its upper end has a gear 52 which meshes with a pinion 53 attached to a gear 54 that engages with a pinion 55 fastened on the shaft 27 (Figs. 1, 2, 3).

The speed of revolution of the turret is retarded just before the detent enters a notch by a brake shoe 56 that is connected by a ball and socket joint 57 with the lever 58 that is pivoted to the bracket 38. At the proper time the end of this lever is engaged by a cam 60 adjustably secured to the shaft 42 for the purpose of applying the brake. A spring 610 fastened to the post tends to press the lever 58 against the cam and also the advance end of the brake shoe toward the braking surface on the turret. This braking mechanism slows down the turret and prevents the index notches from overrunning the index detent (Fig. 14). When the index detent locks the turret against revolution the whole effect of the rotation of the central gear 26 is transmitted to the pinions 25 for rotating the driver spindles 10. With the detent withdrawn a part of the effect of the gear rotation, acting as a differential, revolves the turret and the speed of rotation of the spindles is relatively reduced. There may be as many sockets for receiving blanks on the turret as is desired, there is one driver spindle for each socket, and there are a corresponding number of locking notches in the wall of the turret.

A driver roll 61 is arranged to frictionally engage with the periphery of the upper section of the turret except during the intervals when the detent enters a notch and locks the turret, recesses 62 being made in the periphery of the turret so that the roll will be out of engagement with the turret when the detent enters a notch (Figs. 4, 14). This roll is fastened to a shaft 63 that is supported in bearings in a bracket 64 which is secured to one of the posts 18. On the upper end of the shaft 63 is a pinion 65 that meshes with the gear 52 (Figs. 1, 2). The speed of rotation of this roll 61 which may be of any desired diameter, regulates the speed of revolutions of the turret as a result of its frictional engagement therewith.

In the machine illustrated the revolution of the turret carries the blanks held by the sockets first to means which points the tips and starts the threads and then to means which completes the threads. The pointing and the starting of the thread on the point of a blank may be affected by a single circular cutter 66 (Fig. 8) or by a pair of circular cutters 66a (Fig. 8a). The single cutter has a concave periphery with oblique grooves cut on the pitch of the threads to be formed (Fig. 9.) If two cutters are used they may have flat peripheries obliquely grooved on the pitch of the threads to be formed (Fig. 9a). Each cutter has a multiplicity of teeth around both edges, only those on one edge being used at a time and when these become dull the cutter is turned around and those on the other side used.

Figures 6, 7, 10, 11, 12, 12A, 13, 13A:
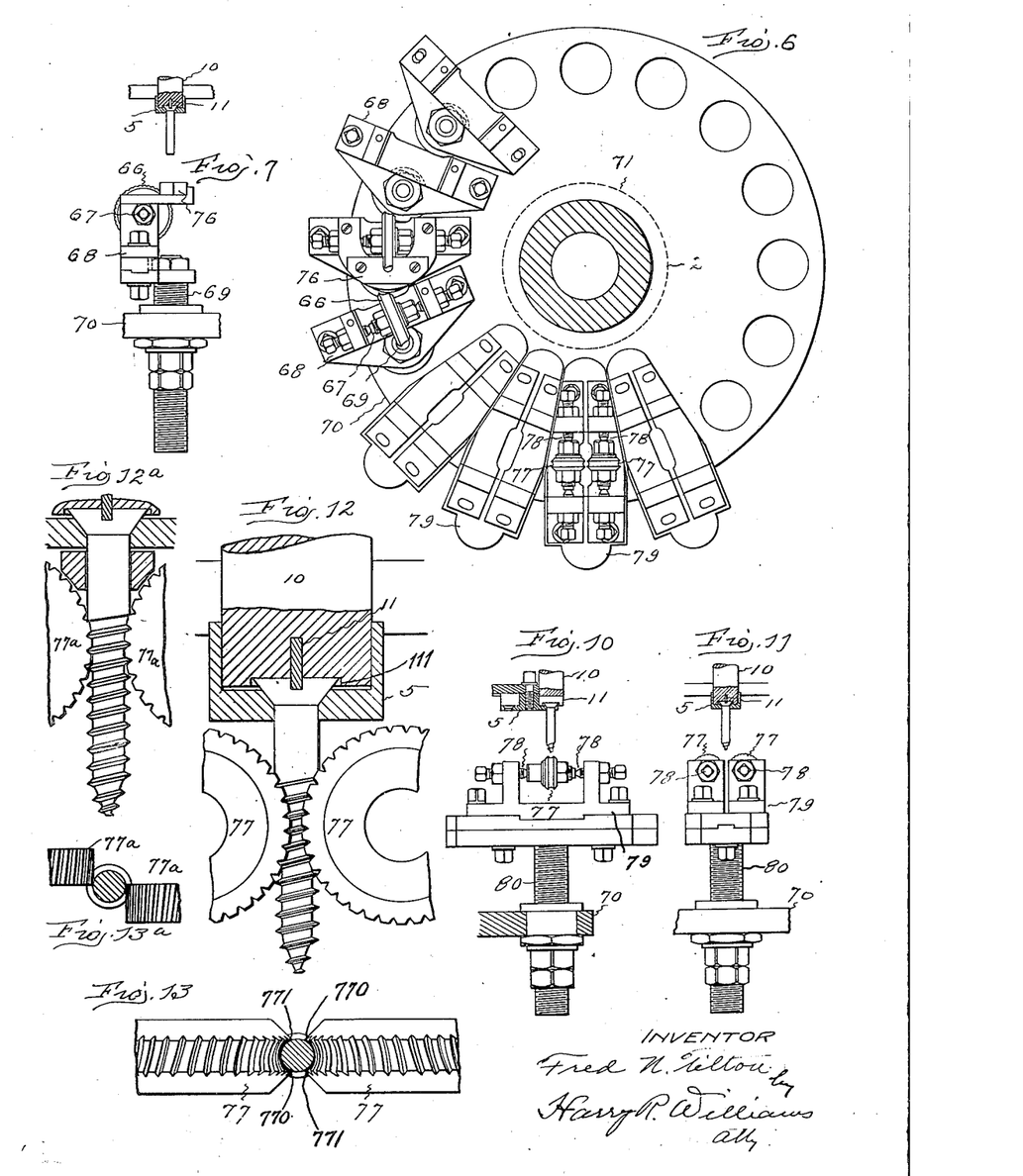
Fig. 6 is a horizontal section looking down at the cutter carrying table from the plane indicated by the dotted line 6—6 on Fig. 1.
Fig. 7 is a side view of the pointing cutter and its support.
Fig. 10 is a front view of the threading cutters and their support.
Fig. 11 is a side view of the threading cutters and their support.
Fig. 12 on greatly enlarged scale shows the threading cutters in action.
Fig. 12a shows a modified form of threading cutters.
Fig. 13 shows an edge view of the threading cutters.
Fig. 13a is an edge view of the modified form of threading cutters.

The cutters are loosely mounted on arbors 67 held by a bracket 68 which is supported by a screw 69 that is threaded through a table 70 (Figs. 5, 6, 7). The table has a sleeve 71 that is fitted to move vertically on the post 2. This sleeve is connected by a pin 72 with a shaft 73 fitted within the post. The shaft 73 has several openings for the pin so that the limits of the vertical path of the table may be changed for different lengths of blanks and the post has a slot 74 which permits the up and down travel of the pin (Fig. 5). The shaft extends down through the bed 3 and is engaged by a cam 75 on the horizontal shaft 48 (Fig. 1). There may be one or more cams 75 on the shaft 48 and these may be shifted along the horizontal shaft so as to engage the vertical shaft 73 in order to raise the table 70 the required distance at the proper times.

Gravity may be depended upon to bring the table down as the cam permits. When the single cutter is used there is attached to the bracket 68 a yoke-shaped plate 76 (Fig. 6) designed to back the blanks while the pointing cutter is operating.

When a pair of cutters are used a backing plate is unnecessary. The table is illustrated as carrying four pointing cutter brackets any one or all of which may be used. As the table rises the pointing cutter engages the blank which is being rapidly rotated at that time by a driver spindle, practically tangentially, that is, as the cutter engages the end of the blank the axis of the blank vertically is on one side of the center of the cutter and the tip of the blank horizontally is slightly above the center of the cutter as illustrated on large scale in Fig. 8. As the cutter teeth come into contact with and rise upon the rapidly rotating blank they quickly cut the initial thread or start of the thread and at the same time point the blank. The pointing cutters may form one or more convolutions of the thread on the point of the blank and then descend allowing the blank to be carried to the threading cutter station.

The threading may be accomplished by a pair of circular cutters 77 which have concave peripheries with oblique grooves (Figs. 12, 13), or by a pair of circular cutters 77a with flat grooved peripheries (Figs. 12a, 13a). The threading cutters are arranged opposite each other and are loose on arbors 78 adjustable in a bracket 79 that is supported by a screw 80 which is threaded through the table 70 (Figs. 10, 11). As the table is raised by the cam 75 and shaft 73 the threading cutters engage the thread started on the point of the blank and following that up complete the thread on the same pitch.

With two opposing freely rotating cutters which are circular and have concave peripheries with oblique grooves, if the teeth thus produced are of the same size and same pitch from the leading or cutting edges 770 to the following edges 771 (Fig. 13), and the axes of the concave arcs are coincident with the axis of the blank, the thread groove will be cut by the leading edges of the teeth and the following surfaces of the teeth will roll down, compress and lap the abraded metal so that the surfaces of the thread and intervening groove will be rendered smooth and of exact form. Owing to the number of cutting teeth each one has to perform but a small amount of work and but one pass is required, consequently the cutters last a long time. The blanks being held down merely by the spring pressed or weighted driver spindles, should anything go wrong the spindles simply lift. No mechanism is provided for rotating the pointing and threading cutters, they being free to rotate perform their operations simply as the result of being fed up against the blanks which are being rapidly rotated by the driver spindles. After a blank is threaded the driver spindle which has engaged and rotated it, is lifted by the engagement of the fixed cam 20 with the collar 19 on the spindle leaving the blank free to be ejected by the finger 22, as above described.

The table is illustrated as provided with four pointing cutter brackets and four threading cutter brackets, any or all of which may be used at one time. If desired, there may be as many as six pointing cutters and six threading cutters operating at the same time, or the pointing cutters may be omitted and twelve threading cutters used. The pitch of the teeth of the cutters may be such as to form either wood screw threads or machine screw threads on the blanks.

When the machine is in operation the blanks are fed in succession to the socketed carrier plates as the turret is revolved, the revolution of which is accomplished by the engagement of the teeth of the central gear 26 with the teeth of the pinions 25 on the driver spindles as controlled by the driven friction roll 61. When a blank reaches pointing position the table 70 is lifted by the cam 75 and the pointing cutter carried against the end of the blank for starting the thread on the point. During this interval the index detent has entered a notch in the turret so as to lock the turret, and as stated, when the turret is locked the central gear 26 through the pinions 25 rapidly rotates the spindles, which at this locality are held down by the weights or the spring pressed buttons 12, so that the driver engages the head of the blank and rotates the blank. After the blank has been pointed and a thread started the table 70 moves down and the blank acted upon by the pointing cutter is carried to a threading station by the revolution of the turret. Just before the blank reaches the threading station the brake shoe 56 is allowed to engage with and slow down the movement of the turret so that the index detent will properly enter a notch and arrest the movement of the turret. After a blank has been threaded the spindle which rotates it is raised so that the blank is free to be ejected. While a blank is being carried from a pointing station to a threading station a following blank is brought to the pointing station, then as the table 70 is lifted one blank is pointed and a previously pointed blank is threaded. These actions continue as long as blanks are delivered to the carrying sockets of the turret.

The invention claimed is:

1. A machine for threading blanks which comprises a turret with means about its periphery for receiving the blanks, driver spindles carried by the turret, connected means for intermittently revolving the turret and rotating the spindles, said means rotating the spindes rapidly when the turret is indexed and rotating the spindles slowly and through the spindles revolving the turret when the indexing means is released, means for reciprocating the spindles, means for indexing the movements of the turret, means movable toward and from the spindles, and freely rotating cutters carried by said last mentioned means.

2. A machine for threading blanks which comprises a turret with means about its periphery for receiving the blanks, driver spindles carried by the turret, connected means for intermittently revolving the turret and rotating the spindles, said means rotating the spindles rapidly when the turret is indexed and rotating the spindles slowly and through the spindles revolving the turret when the indexing means is released, means for reciprocating the spindles, means for indexing the movements of the turret, means movable toward and from the spindles, and freely rotating threading cutters carried by said last mentioned means.

3. A machine for threading blanks which comprises a turret with means about its periphery for receiving the blanks, driver spindles carried by the turret, connected means for intermittently revolving the turret and rotating the spindles, said means rotating the spindles rapidly when the turret is indexed and rotating the spindles slowly and through the spindles revolving the turret when the indexing means is released, means for reciprocating the spindles, means for indexing the movements of the turret, means movable toward and from the spindles, and a freely rotating pointing cutter carried by said last mentioned means.

4. A machine for threading blanks which comprises a turret with means about its periphery for receiving the blanks, driver spindles carried by the turret, connected means for intermittently revolving the turret and rotating the spindles, said means rotating the spindles rapidly when the turret is indexed and rotating the spindles slowly and through the spindles revolving the turret when the indexing means is released, means for reciprocating the spindles, means for indexing the movements of the turret, means movable toward and from the spindles, and freely rotating pointing and threading cutters carried by said last mentioned means.

5. A machine for threading blanks which comprises a turret with means about its periphery for receiving the blanks, driver spindles carried by the turret, connected means for intermittently revolving the turret and rotating the spindles, said means rotating the spindles rapidly when the turret is indexed and rotating the spindles slowly and through the spindles revolving the turret when the indexing means is released, means for reciprocating the spindles, means for indexing the movements of the turret, freely rotating threading cutters, and cam means for feeding said cutters toward the spindles.

6. A machine for threading blanks which comprises a turret with means about its periphery for receiving the blanks, driver spindles carried by the turret, connected means for intermittently revolving the turret and rotating the spindles, said means rotating the spindles rapidly when the turret is indexed and rotating the spindles slowly and through the spindles revolving the turret when the indexing means is released, means for reciprocating the spindles, means for indexing the movements of the turret, freely rotating pointing and threading cutters and cam means for moving said cutters simultaneously toward the spindles.

7. A machine for threading blanks which comprises a revolvable turret with means about its periphery for receiving the blanks, rotatory driver spindles carried by the turret, connected means within the turret for intermittently revolving the turret and rotating the spindles, said means rotating the spindles rapidly when the turret is indexed and rotating the spindles slowly and through the spindles revolving the turret when the indexing means is released, means for reciprocating the spindles, means for indexing the movements of the turret, threading means, and means for moving said threading means toward and from said spindles.

8. A machine for threading blanks which comprises a revolvable turret with means about its periphery for receiving the blanks, rotatory driver spindles carried by the turret, connected means within the turret for intermittently revolving the turret and rotating the spindles, said means rotating the spindles rapidly when the turret is indexed and rotating the spindles slowly and through the spindles revolving the turret when the indexing means is released, means for reciprocating the spindles, means for indexing the movements of the turret, freely rotating threading cutters, and means for moving said cutters toward and from said spindles.

9. A machine for threading blanks which comprises a revolvable turret with means about its periphery for receiving the blanks, rotatory driver spindles carried by the turret, an intermeshing gear and pinions for intermittently revolving the turret and rotating the spindles, said gear and pinions rotating the spindles rapidly when the turret is indexed and rotating the spindles slowly and through the spindles rotating the turret when the index is released, means for reciprocating the spindles, means for indexing the movements of the turret, freely rotating threading cutters, and means for moving said cutters toward and from the spindles.

10. A machine for threading blanks which comprises a revolvable turret with means about its periphery for receiving the blanks, rotatory driver spindles carried by the turret, pinions on said spindles, a gear engaging said pinions for revolving the turret and rotating the spindles, said gear and pinions rotating the spindles rapidly when the turret is indexed and rotating the spindles slowly and through the spindles rotating the turret when the index is released, means for reciprocating the spindles, means for indexing the movement of the turret, freely rotating threading cutters, and means for moving said cutters toward and from the spindles.

11. A machine for threading blanks which comprises a turret with means about its periphery for receiving the blanks, driver spindles carried by the turret, connected means for intermittently revolving the turret and rotating the spindles, said means rotating the spindles rapidly when the turret is indexed and rotating the spindles slowly and through the spindles revolving the turret when the indexing means is released, yielding means for resisting the upward movements of the spindles during a sector of their travel with the turret, means for lifting the spindles during a sector of their travel with the turret, means for indexing the movements of the turret, threading cutters, and means for moving said cutters toward and from the spindles.

12. A machine for threading blanks which comprises a turret with means about its periphery for receiving the blanks, driver spindles carried by the turret, interconnected means for intermittently revolving the turret and rotating the spindles, said means rotating the spindles rapidly when the turret is indexed and rotating the spindles slowly and through the spindles revolving the turret when the indexing means is released, means for reciprocating the spindles, means for indexing the movements of the turret, freely rotating threading cutters, and means for moving said cutters toward and from the spindles.

13. A machine for threading blanks which comprises a revolvable turret with means about its periphery for receiving the blanks, driver spindles carried by the turret, means for reciprocating said spindles, connected means for intermittently revolving the turret and rotating the spindles, said means rotating the spindles rapidly when the turret is indexed and rotating the spindles slowly and through the spindles revolving the turret when the indexing means is released, means for indexing the movements of the turret, means for retarding the movement of the turret immediately preceding the action of said index means, freely rotating threading cutters, and means for moving said cutters toward and from the spindles.

14. A machine for threading blanks which comprises a revolvable turret with means about its periphery for receiving the blanks, driver spindles carried by the turret, means for reciprocating said spindles, connected means for intermittently revolving the turret and rotating the spindles, said means rotating the spindles rapidly when the turret is indexed and rotating the spindles slowly and through the spindles revolving the turret when the indexing means is released, a detent for indexing the movement of the turret, a brake for retarding the movement of the turret immediately preceding the action of said index detent, freely rotating threading cutters, and means for moving said cutters toward and from the spindles.

15. A machine for threading blanks which comprises a revolvable turret with means about its periphery for receiving the blanks, driver spindles carried by the turret, spring means for resisting the upward movement of said spindles during a sector of their travel, a fixed cam for lifting the spindles during a sector of their travel, connected means for intermittently revolving the turret and rotating the spindles, said means rotating the spindles rapidly when the turret is indexed and rotating the spindles slowly and through the spindles revolving the turret when the indexing means is released, a detent for indexing the movements of the turret, a brake for retarding the movement of the turret immediately preceding the action of said index detent, threading cutters, and means for moving said cutters toward and from the spindles.

16. A machine for threading blanks which comprises a revolvable turret with means about its periphery for receiving the blanks, driver spindles carried by the turret, spring means for resisting the upward movement of said spindles during one sector of their travel, a fixed cam for lifting the spindles during a sector of their travel, connected means for intermittently revolving the turret and rotating the spindles, said means rotating the spindles rapidly when the turret is indexed and rotating the spindles slowly and through the spindles revolving the turret when the indexing means is released, a detent for indexing the movements of the turret, a brake for retarding the movement of the turret immediately preceding the action of said index detent, freely rotating threading cutters, and means for moving said cutters toward and from the spindles.

17. A machine for threading blanks which comprises a revolvable turret with means about its periphery for receiving the blanks, driver spindles carried by the turret, means for reciprocating said spindles, connected means for intermittently revolving the turret and rotating the spindles, said means rotating the spindles rapidly when the turret is indexed and rotating the spindles slowly and through the spindles revolving the turret when the indexing means is released, friction means for regulating the revolutionary movements of the turret, means for indexing the movements of the turret, means for retarding the movement of the turret immediately preceding the action of said index means, threading cutters, and means for moving said cutters toward and from the spindles.

18. A machine for threading blanks which comprises a revolvable turret with means about its periphery for receiving the blanks, driver spindles carried by the turret, means for reciprocating said spindles, connected means for intermittently revolving the turret and rotating the spindles, said means rotating the spindles rapidly when the turret is indexed and rotating the spindles slowly and through the spindles revolving the turret when the indexing means is released, friction means for regulating the revolutionary movements of the turret, means for indexing the movements of the turret, means for retarding the movement of the turret immediately preceding the action of said index means, freely rotating pointing and threading cutters, and means for moving said cutters toward and from the spindles.

19. A machine for threading blanks which comprises an intermittently revolvable turret with means about its periphery for receiving the blanks, driver spindles carried by the turret, pinions on said spindles, means for reciprocating said spindles, a gear engaging said pinions for revolving the turret and rotating the spindles, said gear and pinions rotating the spindles rapidly when the turret is indexed and rotating the spindles slowly and through the spindles rotating the turret when the index is released, friction means for regulating the revolutionary movements of the turret, means for indexing the movements of the turret, means for retarding the movement of the turret immediately preceding the action of said index means, freely rotating threading cutters, and means for moving said cutters toward and from the spindles.

20. A machine for threading blanks which comprises a revolvable turret, rotatory and reciprocatory driver spindles carried by the turret, pinions on said spindles, a driving gear engaging said pinions, yielding means adapted to resist the movement of the spindles in one direction during a sector of the travel of the spindles, fixed means for moving the spindles in the opposite direction for a sector of their travel, a detent adapted to engage the turret for indexing the same, cam means for releasing the detent at intervals, a brake for retarding the turret preceding the engagement of the detent with the turret, a cam for causing said brake to be set, a friction roll engaging the periphery of the turret and controlling the revolution of the turret except during the interval when the detent engages the turret, and freely rotating cutters movable toward the spindles.

21. A machine for threading blanks which comprises a revolvable turret, said turret having sockets about its periphery for receiving blanks, rotatory and reciprocatory driver spindles carried by the turret, pinions on said spindles, a driving gear engaging said pinions, said gear and pinions rotating the spindles rapidly when the turret is indexed and rotating the spindles slowly and through the spindles rotating the turret when the index is released, yielding buttons for resisting the upward movement of the spindles during a sector of the travel of the spindles, a cam for lifting the spindles during a sector of their travel, a detent adapted to engage the turret for indexing the same, cam means for at intervals releasing the detent from the turret, a table movable toward and from the turret, cam means for moving the table toward the turret, and freely rotatable pointing and threading cutters carried by the table.

22. A machine for threading blanks which comprises a revolvable turret, said turret having sockets about its periphery for receiving blanks, rotatory and reciprocatory driver spindles carried by the turret, pinions on said spindles, a driving gear engaging said pinions, said gear and pinions rotating the spindles rapidly when the turret is indexed and rotating the spindles slowly and through the spindles rotating the turret when the index is released, yielding buttons adapted to be engaged by the spindles during a sector of the travel of the spindles, a cam for moving the spindles away from the sockets during a sector of the travel of the spindles, a detent adapted to engage the turret for indexing the same, means for releasing the detent from the turret, a friction roll engaging the periphery of the turret and controlling the revolution of the same, a table movable toward and from the turret, cam means for moving the table toward the turret, and threading cutters carried by the table.

23. A machine for threading blanks which comprises a revolvable turret, said turret having sockets about its periphery for receiving blanks, rotatory and reciprocatory driver spindles carried by the turret, pinions on said spindles, a driving gear engaging said pinions, said gear and pinions rotating the spindles rapidly when the turret is indexed and rotating the spindles slowly and through the spindles rotating the turret when the index is released, yielding buttons for resisting the movements of the spindles from said sockets, during a sector of the travel of the spindles, a fixed cam for moving the spindles away from the sockets during a sector of the travel of the spindles, a detent adapted to engage the turret for indexing the same, cam means for releasing the detent from the turret, a brake and means for causing the brake to engage the turret immediately preceding the engagement of the detent with the turret, a table movable toward and from the turret, cam means for moving the table toward the turret, and threading cutters carried by the table.

24. A machine for threading blanks which comprises a revolvable turret, said turret having sockets for receiving blanks, rotatory and reciprocatory driver spindles carried by the turret, pinions on said spindles, a driving gear engaging said pinions, said gear and pinions rotating the spindles rapidly when the turret is indexed and rotating the spindles slowly and through the spindles rotating the turret when the index is released, yielding buttons for resisting the movements of the spindles from said sockets during a sector of the travel of the spindles, a fixed cam for moving the spindles away from the sockets during a sector of the travel of the spindles with the turret, a detent adapted to engage the turret for indexing the same, cam means for at intervals releasing the detent from the turret, a brake and means for causing the brake to engage the turret immediately preceding the engagement of the detent with the turret, a cam for setting the brake, a friction roll engaging the periphery of the turret and controlling the revolution of the same, a table movable toward and from the turret, cam means for moving the table toward the turret, and rotatable pointing and threading cutters carried by the table.

25. A machine for threading blanks which comprises a revolvable blank receiving turret, said turret carrying rotatory and reciprocatory driver spindles, pinions on said spindles, a driving gear engaging said pinions, said gear and pinions rotating the spindles rapidly when the turret is indexed and rotating the spindles slowly and through the spindles rotating the turret when the index is released, a detent adapted to engage the turret for indexing the same, means for at intervals releasing the detent from the turret, a brake and means for causing the brake to engage the turret immediately preceding the engagement of the detent with the turret, a driven friction roll engaging the periphery of the turret and controlling the revolution of the same, and threading cutters movable toward and from the spindles.

26. A machine for threading blanks which comprises a revolvable blank receiving turret, said turret carrying rotatory and reciprocatory driver spindles, pinions on said spindles, a driving gear engaging said pinions, said gear and pinions rotating the spindles rapidly when the turret is indexed and rotating the spindles slowly and through the spindles rotating the turret when the index is released, means adapted to engage the turret for indexing the same, a driven friction roll engaging the periphery of the turret and controlling the revolution of the same except during the interval when the index means engages the turret, and threading cutters movable toward and from the spindles.

27. A machine for threading blanks which comprises a revolvable blank carrying turret, means for intermittently revolving the turret, rotatory and reciprocatory driver spindles carried by the turret, means for rotating and reciprocating said spindles, means adapted to engage the turret for indexing the same, a driven friction roll engaging the periphery of the turret and controlling the revolution of the turret, and threading cutters movable toward and from the spindles.

28. A machine for threading blanks which comprises a revolvable blank carrying turret, means adapted to engage the turret for indexing the same, rotatory and reciprocatory spindles carried by the turret, means for reciprocating the spindles, pinions on the spindles, and a driving gear engaging said pinions and causing the rotating of the spindles when the turret is indexed and through the spindles causing the revolution of the turret when the indexing means is released.

29. In a screw machine a reciprocatory and rotatory spindle having means for engaging and rotating the head of a screw blank, a freely rotating cutter movable toward and adapted to point and thread the point of the blank, means fixed with relation to the spindle movements for centering the head end of the blank, a member fixed adjacent to the end of the spindle for retaining the head end of the blank in said centering means, and a non-rotatable member adjacent to and movable with the cutter toward the point end of the blank for centering the point end of the blank.

30. In a screw machine a reciprocatory and rotary spindle having a socket for receiving and centering the slotted head of a screw blank and a blade in the socket adapted to enter the slot in the blank head, a non-rotating member fixed adjacent to the socketed end of the spindle for retaining the head of the blank in the centering socket, a freely rotating cutter movable toward and adapted to point and thread the point end of the blank, and a non-rotatable member movable with the cutter toward the point end of the blank for centering the point end of the blank.

31. In a screw machine a reciprocatory and rotatory spindle with means for engaging and rotating the head of a screw blank, a freely rotating cutter movable toward and adapted to point and thread the point of the blank, a member fixed adjacent to the driving end of the spindle, said member being socketed for receiving the end of the spindle and socketed for receiving and retaining the head of the blank, and a member fixed adjacent to the cutter for centering the point end of the blank.

32. In a screw machine a rotatory and reciprocatory spindle with means for engaging and rotating the head of a screw blank, a freely rotating cutter movable toward and adapted to engage the blank for threading the same, and a non-rotatory member fixed adjacent to the end of the spindle, said member engaging and guiding the end of the spindle and being recessed for receiving and retaining the head of a blank engaged by the spindle.

33. In a screw machine a reciprocatory and rotatory spindle with means for engaging and rotating the head of a screw blank, freely turning rotatory tools with cutting teeth and conforming rolling teeth which mill and substantially coincidently roll a thread on the blank, and means for advancing the tools along the blank.

34. In a screw machine a rotary spindle, a support retaining said spindle vertically, said spindle having a free vertical gravity movement in said support and provided with means for engaging and rotating the head of a screw blank, means for rotating the spindle, freely turning rotary means with teeth for cutting and teeth for rolling a thread on the blank, and means for carrying said threading means toward the spindle.

35. In a screw machine rotatory spindles, intermeshing gears for rotating the spindles, a support for the spindles, said spindles having free vertical gravity movements through said gears and support and provided with means for engaging and rotating the heads of screw blanks, a cam fixed on said support for lifting the spindles from the blanks, and freely rotating means movable toward the spindles, said means having teeth for milling and teeth for rolling threads on the blanks.

36. In a screw machine a rotatory spindle, a support for said spindle, said spindle having a free vertical movement in said support and provided with means for engaging and rotating the head of a screw blank, rotatable means movable toward the spindle for threading the blank, and yielding means above the upper end of the spindle which cushions upward thrust against the lower end of the spindle while a thread is being formed on the blank.

37. In a screw machine a reciprocatory and rotatory vertically arranged spindle with means for engaging and rotating the head of a screw blank, a vertically movable table, means for automatically raising the table, said table being lowered by gravity, and a freely rotating cutter mounted on said table and in cooperation with the spindle pointing and threading the lower end of the blank.

38. In a screw machine a reciprocatory and rotatory vertically arranged spindle with means for engaging and rotating the head of a screw blank, a vertically movable table, means for automatically raising the table, said table being lowered by gravity, and freely rotating opposed thread cutters mounted on said table and cooperating with the spindle to thread the body of the blank.

39. In a screw machine a reciprocatory and rotatory vertically arranged spindle with means for engaging and rotating the head of a screw blank, a vertically movable table, means for automatically raising the table, said table being lowered by gravity, a freely rotating pointing cutter and freely rotating threading cutters mounted on the table, said cutters cooperating with the spindle to point and thread the blank.

40. In a screw machine a reciprocatory and rotatory vertically arranged spindle with means for engaging and rotating the head of a screw blank, a vertically movable table, means for automatically raising the table, said table being lowered by gravity, and a pair of opposed threading cutters adjustable horizontally toward and from each other on said table.

41. In a screw machine a reciprocatory and rotatory vertically arranged spindle with means for engaging and rotating the head of a screw blank, a table, means for automatically raising the table, said table being lowered by gravity, and freely rotating cutters mounted on said table and cooperating with the spindle to thread the blank, and means for adjusting said cutters vertically with relation to the table.

42. In a screw machine a reciprocatory and rotatory vertically arranged spindle with means for engaging and rotating the head of a screw blank, a table, a cam for lifting the table, said table being lowered by gravity, an adjustable connection between said cam and the table, and freely rotating cutters adjustably mounted on said table.

43. A machine for milling blanks which comprises an intermittently rotated turret having means for receiving and retaining the blanks, said turret carrying rotatory spindles which are movable vertically for engaging the blanks, and freely rotatable annular thread cutters movable vertically toward and from the spindles and adapted to first engage and mill the lower ends of the blanks and then engage and mill the bodies of the blanks.

44. A machine for milling blanks which comprises an intermittently rotated turret having means for receiving and centering the upper ends of the blanks, said turret carrying spindles which are movable vertically for engaging the blanks, a table movable vertically toward and from the spindles, freely rotatable annular cutters carried by said table and adapted to first engage and mill the lower ends of the blanks and then engage and mill the bodies of the blanks, and means movable with said table for centering the lower ends of the blanks.

45. A machine for milling blanks which comprises an intermittently rotatable turret having means for centering and retaining the upper ends of the blanks, said turret carrying vertically arranged and gravity dropped spindles for engaging and rotating the blanks, and freely rotatable annular cutters movable vertically toward and from the spindles and adapted to first engage and mill the lower ends of the blanks and then engage and mill the bodies of the blanks.

46. A machine for milling blanks which comprises an intermittently rotatable turret having means for receiving and retaining the blanks, said turret carrying vertically arranged and gravity dropped spindles for engaging and rotating the blanks, and freely rotatable annular cutters positively carried toward the spindles and dropped by gravity from said spindles, said cutters being arranged to first engage and mill the lower ends of the blanks and then engage and mill the bodies of the blanks.

47. A machine for milling blanks which comprises an intermittently rotatable turret having means for receiving and retaining the blanks, said turret carrying vertically movable spindles for engaging and rotating the blanks, freely rotatable vertically movable annular cutters, and positive means for carrying said cutters up whereby they may mill the blanks, said means allowing the cutters to move downwardly by gravity to a horizontal plane below the horizontal plane of the lower ends of the blanks.

48. In a screw machine a rotatory and vertically movable spindle, said spindle having in its lower end a socket for receiving and centering the head of a blank and a blade for entering a slot in the blank head, and freely rotatable cutters movable upwardly to form a thread at the tip and along the body of the blank.

49. In a screw machine a rotatory turret having means for receiving and retaining a screw blank, a rotatory and reciprocatory vertically arranged spindle carried by the turret, freely rotatable cutters movable vertically toward and from the spindle for threading the blank, means fixed with relation to the rotation of the turret for holding the spindle raised during the interval of entry of a blank to the turret, and yielding means fixed relatively to the rotation of the turret for pressing down and cushioning the spindle during the interval of threading.

50. In a screw machine a rotatory turret, a rotatory and reciprocatory spindle carried by the turret, said spindle having means for engaging the head end of and rotating a screw blank, freely rotating tools movable toward the point end and along the blank, said tools coincidently compressing and cutting a thread on the surface of the blank.

51. A method of threading cylindrical wood screw blanks which comprises feeding freely rotating milling cutters to the point end and along the body of a blank thereby forming a continuous thread, whereby the full diameter and strength of the blank is in advance of the cutters and the blank does not yield or break as the cutters advance and thus the thread is accurate and concentric with the axis of the blank from end to end.

52. A method of threading cylindrical wood screw blanks which comprises feeding freely rotating tools to the point end and along the body of a blank thereby coincidently cutting and compressing a continuous thread on the surface of the blank, the full diameter and strength of the blank being in advance of the tools during the entire formation of the thread.

53. A method of threading cylindrical wood screw blanks which comprises feeding freely rotating tools to the point end and along the body of a blank thereby cutting a continuous thread on the point and along the surface of the body of the blank, and following cutting with a thread rolling action which smoothes the surfaces of the thread and ensures its exact shape.

FRED N. TILTON.